(12) United States Patent
Somerville

(10) Patent No.: US 7,142,041 B2
(45) Date of Patent: Nov. 28, 2006

(54) CONTROLLED ACTIVE SHUTDOWN OF CHARGE PUMP

(75) Inventor: Alan Somerville, Chippenham (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 260 days.

(21) Appl. No.: 10/947,965

(22) Filed: Sep. 23, 2004

(65) Prior Publication Data
US 2006/0056208 A1    Mar. 16, 2006

(30) Foreign Application Priority Data
Sep. 14, 2004    (EP)    ................... 04368062

(51) Int. Cl.
  *G05F 1/10*    (2006.01)
  *G05F 3/02*    (2006.01)
  *H02M 3/18*    (2006.01)
  *H02M 7/122*    (2006.01)

(52) U.S. Cl. ........................... 327/536; 363/60

(58) Field of Classification Search .................. 363/59, 363/60; 327/390, 535, 536, 537
See application file for complete search history.

(56) References Cited

U.S. PATENT DOCUMENTS

| | | | | |
|---|---|---|---|---|
| 5,729,172 A | * | 3/1998 | Tsukada | ...................... 327/536 |
| 5,874,847 A | * | 2/1999 | Kim et al. | ................... 327/390 |
| 6,255,896 B1 | | 7/2001 | Li et al. | ...................... 327/536 |
| 6,392,904 B1 | | 5/2002 | Bayer et al. | ................... 363/59 |
| 6,445,243 B1 | * | 9/2002 | Myono | ......................... 327/536 |
| 6,483,282 B1 | | 11/2002 | Bayer | ......................... 323/315 |
| 6,597,156 B1 | | 7/2003 | Gogolla | ....................... 323/224 |
| 6,707,336 B1 | * | 3/2004 | Kawai et al. | ................ 327/536 |
| 6,724,241 B1 | * | 4/2004 | Bedarida et al. | ............. 327/536 |
| 2001/0015672 A1 | | 8/2001 | Rey et al. | |

FOREIGN PATENT DOCUMENTS

| | | |
|---|---|---|
| DE | 10202478 A | 8/2003 |
| EP | 1278202 A | 1/2003 |

* cited by examiner

*Primary Examiner*—Matthew V. Nguyen
(74) *Attorney, Agent, or Firm*—Saile Ackerman LLC; Stephen B. Ackerman

(57) ABSTRACT

Circuits and methods to shut down any charge pump having any number of stages have been achieved. The invention is especially relevant to charge pumps, which have a supply that is incapable of sinking significant current, such as a supply derived from an LDO. The shutdown can be done either until all stages have zero voltage or until all stages have the input voltage level. The shutdown is performed in a staged manner, from the output backwards to the input, so there is reduced charge sharing between the capacitors so that no voltage exceeds its normal operating range. An additional advantage of the present invention is that the charge pump can be switched back on, before the shutdown sequence is complete, with all internal and external nodes of the charge pump staying within their normal operating range.

22 Claims, 4 Drawing Sheets

CONTROLLED ACTIVE SHUTDOWN OF CHARGE PUMP

BACKGROUND OF THE INVENTION (1) Field of the Invention

This invention relates generally to voltage converter circuits using charge pumps and relates more particularly to the usage of an active circuitry to discharge all capacitors employed by such a charge pump.

(2) Description of the Prior Art

Charge pumps are circuits that generate a voltage larger than the supply voltage from which they operate. Charge pumps are a form of DC-DC converters that rely on capacitors instead of inductors for energy storage and transfer. The absence of inductors makes them attractive in situations requiring a low-power auxiliary supply. They use less circuit-board area, offer minimal component height, and are easy to use.

Charge pumps are switching capacitors circuits. The basic circuit is made from switches and capacitors. Charge pumps work as fixed multipliers, positive or negative, of the supply voltage. In order to generate twice the supply voltage two capacitors are required. One capacitor is a "flying" capacitor actually doing the pumping and one capacitor is acting as a reservoir, holding the generated voltage.

In order to generate three times the supply voltage two flying capacitors are required and one reservoir capacitor, in order to generate four times the supply voltage three flying capacitors are required and one reservoir capacitor, etc. for five times the supply voltage.

Charge pumps can have regulated or unregulated outputs. An unregulated charge pump either doubles or inverts the voltage that powers it and the output voltage is a function of the supply voltage. A regulated charge pump either boosts or inverts the supply voltage. Its output voltage is independent of the supply voltage.

Active discharge circuits in voltage charge pumps are normally used to shut down the circuit or reduce the output voltage to an initial value.

Especially for charge pumps having multiple stages it is important to control the discharge process to avoid excessive voltage on the capacitors during a shutdown of the charge pump.

There are patents known dealing with the control of the discharge of capacitors:

U.S. Pat. No. (6,392,904 to Bayer et al.) describes a DC/DC converter including a charge pump circuit comprising one or more capacitors and a plurality of controllable switches connected thereto, the controllable switches being controllable by a control circuit so that the capacitors is/are alternatingly switched in a charging and discharge phase; a first current source set to a predetermined base current located either in the discharge or charging path of the charge pump circuit and a second current source connected in parallel thereto; and a regulator circuit for generating a first control signal representing the difference between a voltage characterizing the output voltage and a first reference voltage and controlling the second current source when the charge pump circuit is active so that the controllable current is reduced or increased with an increase and reduction respectively in the difference to track the voltage characterizing the output voltage in accordance with the first reference voltage; and for generating a second control signal guided to the control circuit, this signal assuming a first status when the voltage characterizing the output voltage exceeds a second reference voltage at a predetermined level above the first reference voltage, upon which the control circuit deactivates the charge pump circuit, and assumes a second status when the voltage characterizing the output voltage drops below the second reference voltage, upon which the control circuit activates the charge pump circuit.

U.S. Pat. No. (6,483,282 to Bayer) discloses a charge pump-type DC/DC converter comprising n elementary stages, each consisting of a charge pump capacitor and several controllable switches connected thereto, whereby the input voltage of the DC/DC converter is applied to the input of the first stage, both electrodes of the charge pump capacitor of the $k^{th}$ stage are each connectable to one of the controllable switches with the output of the $(k-1)^{th}$ stage, $k=2, \ldots, n$ and the output of the $n^{th}$ stage forms the output of the DC/DC converter. The DC/DC converter in accordance with the invention is characterized in that it in addition enables one or more further controllable switches to be connected, via which the electrode of the charge pump capacitor of the $n^{th}$ stage which in the discharge phase is not connected to the output of the converter, to one or more outputs of the $1^{th}$ stage $(1=(n-2), \ldots 1)$ and/or of the input voltage, and comprises a control circuit which in the discharge phase of the charge pump cycle signals ON, as a function of the input voltage of the DC/DC converter, that switch of the array consisting of the one controllable switch via which the electrode of the charge pump capacitor of the $n^{th}$ stage can be connected to the output of the $(n-1)^{th}$ stage and the further controllable switches and connects the voltage applied thereto to the cited electrode of the charge pump capacitor of the $n^{th}$ stage at which the efficiency of the DC/DC converter is a maximum.

U.S. Pat. No. (6,597,156 to Gogolla) discloses an arrangement and a method for generating high voltage from a low-voltage supply source using a charge reservoir chargeable and rechargeable to the desired high voltage or higher via a charge pump. A first switching device regulates the supply of electric charge from the precharged charge reservoir to a separate storage capacitor. As a result, a high voltage signal that is extensively noise-free is available during certain operating phases, such as a measurement process. A second switching device ensures a regulated discharge from the storage capacitor when the capacitor is overcharged, for example, for the readjustment of the high voltage to be generated. A capacitive voltage divider, which reduces the high voltage without losses, is provided to determine the actual value of the high voltage. At very small currents, the desired high voltage can be maintained by using the capacitive voltage divider for a substantially longer time than by using an ohmic voltage divider.

SUMMARY OF THE INVENTION

A principal object of the present invention is to achieve a shutdown circuit for charge pumps until zero voltage is reached avoiding any excessive voltages.

Another principal object of the present invention is to achieve a method for a shutdown of charge pumps until input voltage level is reached avoiding any excessive voltages.

A further principal object of the present invention is to achieve a method for a shutdown of charge pumps until zero voltage level is reached avoiding any excessive voltages.

In accordance with the objects of this invention a circuit to shut down any charge pump having any number n of stages avoiding excessive voltages has been achieved. The circuit invented is comprising, first, a control circuitry to control the shut-down of the charge pump having input and output, wherein the input comprises a shut-down signal, and the voltage levels of each of the n stages of the charge pump and the output comprises signals to shut switching means of each stage individually from the output backwards to the input according to the results of comparisons of the voltage levels of the nth stage with the voltage level of the (n−1)th stage and furthermore said signals to shut switching means to initiate the discharge of the capacitor of a related stage. Furthermore the circuit comprises n switching means for each stage of the charge pump to discharge the capacitor of the related stage, wherein each of said switching means is connected via a serial current limiting impedance to ground and to the voltage of the related stage and wherein the discharge of the related capacitor is controlled by said control circuitry, a control circuitry to control the normal operation of the charge pump until a shut-down signal is received and the control is taken over by said control circuitry to shut-down the charge pump, and n switching means for each stage to interconnect said n stages wherein said switching means can be activated as well by said control circuitry to control the normal operation as by the control circuitry to control the shut-down.

In accordance with the objects of this invention a circuit to shut down any charge pump having three stages avoiding excessive voltages has been achieved. The circuit invented is comprising, first a control circuitry to control the shut-down of the charge pump having input and output, wherein the input comprises a shut-down signal, and the voltage levels of each of the three stages of the charge pump and the output comprises signals to shut switching means of each stage individually from the output backwards to the input according to the results of comparisons of the voltage levels of a stage with the voltage level of the neighboring stage in input direction furthermore said signals to shut switching means to initiate the discharge of the capacitor of a related stage. Furthermore the circuit is comprising three switching means for each stage of the charge pump to discharge the capacitor of the related stage, wherein each of said switching means is connected via a serial current limiting impedance to ground and to the voltage of the related stage and wherein the discharge of the related capacitor is controlled by said control circuitry, a control circuitry to control the normal operation of the charge pump until a shut-down signal is received and the control is taken over by said control circuitry to shut-down the charge pump, and three switching means for each stage to interconnect said three stages wherein said switching means can be activated as well by said control circuitry to control the normal operation as by the control circuitry to control the shut-down.

In accordance with the objects of this invention a method to shut-down a charge pump in stages from the output backwards to the input stage to zero voltage avoiding excessive voltages has been achieved. The method invented is comprising the following steps, first, (1) providing a charge pump having N stages, N switching means for each stage of the charge pump to discharge the capacitor of the related stage, N switching means for each stage to interconnect said N stages, and a control circuitry controlling the shut-down of said charge pump. The following steps comprise (2) to set the voltage level of all capacitors to the lowest operational level, (3) to discharge capacitor of the output stage until voltage level of the next stage towards input is reached, and (4) to go to the next stage towards input. The next steps are (5) to check if this actual is the input stage, then go to step 7 else go to step 6, (6) to discharge all capacitors of the actual stage and of the stages towards output until voltage level of the next stage towards input is reached and go to step 4, step (7) to discharge all capacitors to zero voltage level, and step (8) shut-down is completed.

In accordance with the objects of this invention a method to shutdown a charge pump in stages from the output backwards to the input stage to input voltage level avoiding excessive voltages has been achieved. Said method is comprising the following steps, first, (1) providing a charge pump having N stages, N switching means for each stage of the charge pump to discharge the capacitor of the related stage, N switching means for each stage to interconnect said N stages, and a control circuitry controlling the shut-down of said charge pump. The next steps of the method invented are (2) to set the voltage level of all capacitors to the lowest operational level, (3) to discharge capacitor of the output stage until voltage level of the next stage towards input is reached, and (4) to go to the next stage towards input. The next steps are (5) to check if this actual is the input stage, then go to step 7 else go to step 6, (6) to discharge all capacitors of the actual stage and of the stages towards output until voltage level of the next stage towards input is reached and go to step 4, step (7) shut-down is completed.

(3) to set a stage counter n to the maximum number N of stages of the charge pump, (4) to discharge capacitor of the nth stage until voltage level of (n−1)th stage is reached, and (5) to reduce stage counter n by 1. The last steps of the method are (6) to check if stage counter equals 1, then go to step 8 else go to step 7, (7) to discharge all capacitors of the nth and higher stages until voltage level of (n−1)th stage is reached and go to step 5, (8) shut-down is completed.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel circuit using an active circuitry to discharge the voltage present on all the capacitors employed by a charge pump in a way that the capacitors can be fully discharged or discharged to the point at which they have the supply voltage across them, without passing current back into supply. The invention is especially relevant to charge pumps, which have a supply that is incapable of sinking significant current, such as a supply derived from a low dropout regulator (LDO). The invention is also relevant to charge pumps that have an active charge/discharge function.

Figure 1:
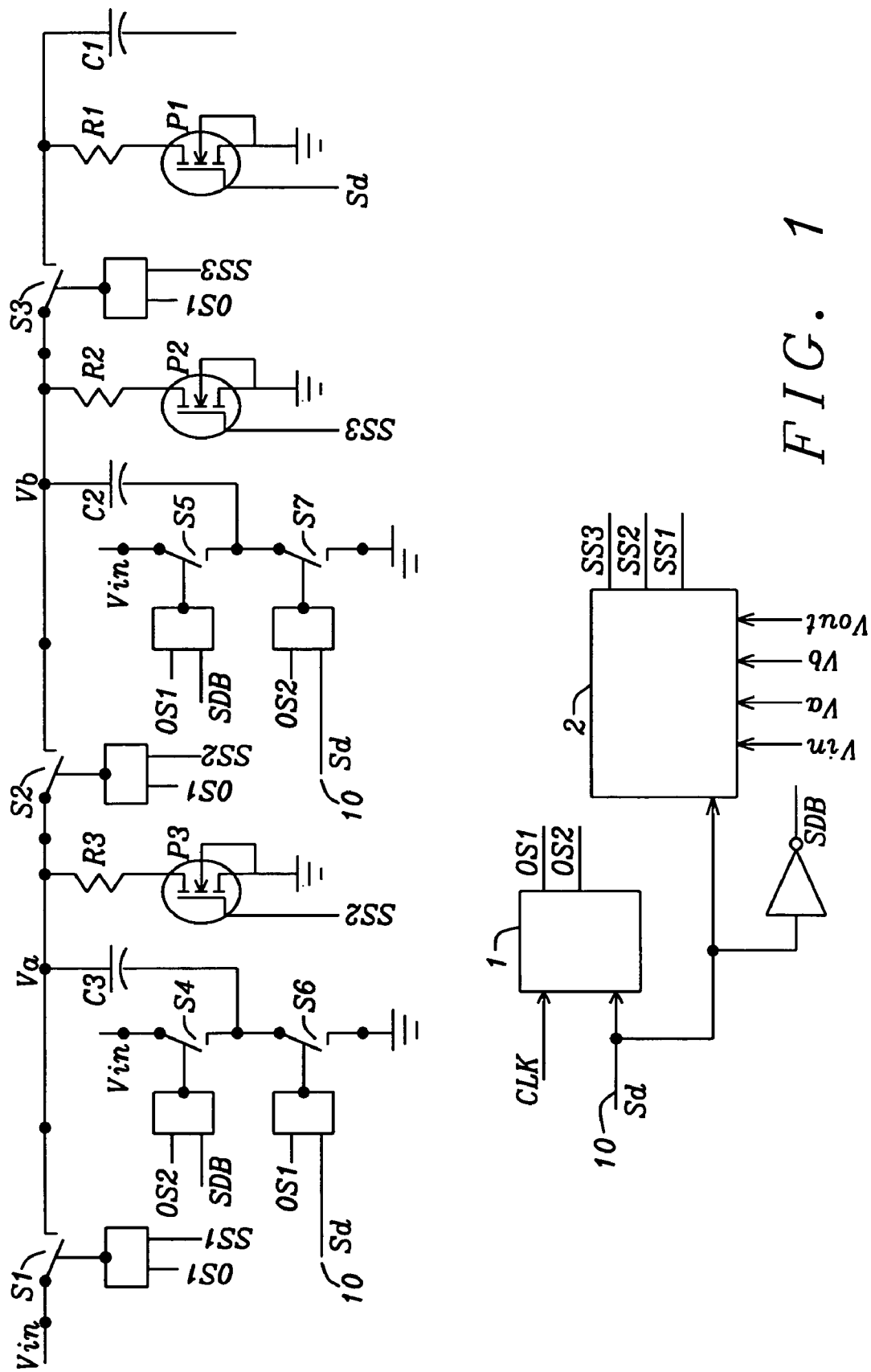
FIG. 1 shows a principal schematic of the present invention.

FIG. 1 shows, as example of the circuit invented, a schematic of an application with a regulated voltage 3×-charge pump. It should be understood that the invention is applicable to any charge pump configuration having n stages, wherein n could be any number.

The circuit of FIG. 1 shows a charge pump having three stages, having three main voltage levels, firstly, the input voltage $V_{in}$, then the voltage level of the first stage $V_a$, the voltage level of the second stage $V_b$ and the output voltage $V_{out}$. Furthermore FIG. 1 shows the control block 1 for normal operation and the control block 2 used for shut-down of the charge pump. During normal operation of the 3× charge pump shown the voltage level $V_a$ can be either equal to the input voltage $V_{in}$ or twice $V_{in}$; the voltage level $V_b$ can be either twice the input voltage $V_{in}$ or three times of the input voltage $V_{in}$, and the output voltage $V_{out}$ is three times the input voltage $V_{in}$. Capacitor C3 holds the voltage $V_a$, capacitor C2 holds the voltage $V_b$ and the "reservoir" capacitor C1 holds the output voltage $V_{out}$. For the discharge of the capacitors C1, C2, and C3 in a preferred embodiment transistor switches P1, P2. and P3 all of the type n-channel MOSFET enhancement mode has been used. Other suitable transistor types could be used as well.

Control block 1 controls the normal operation of the charge pump controlling switches s1 to s7. Their outputs are the signals os1 and os2. Signal os1 is controlling switches s1, s3, s5, and s6 during normal operation. Signal os2 is controlling switches s2, s4, and s7 during normal operation. Its input are a clock pulse clk and a shut down signal sd. In case of an occurrence of the shut down signal sd an inverted signal SDB is generated and the control of the charge pump is taken over by the control block 2 for shut down. The function of the SDB signal is to drive switches s4 and s5 to the correct condition during discharge.

The inputs of the control block 2 for shutdown are the voltages $V_{in}$, $V_a$, $V_b$, and $V_{out}$. The outputs of the control block 2 for shutdown are the signals ss1, ss2, and ss3.

The shut-down process of the present invention starts by initially opening all the top switches s1 to s5 and, using said signal "shut down" sd, closing the bottom switches s6 and s7, thus placing capacitors C2 and C3 in their lowest potential state. The storage capacitor C1 is discharged, initiated by shut down signal sd, in a controlled manner via current limiting resistor R1 and transistor switch P1 until its voltage is approximately equal to the voltage $V_b$ on C2, at which point the control block 2 closes switch s3 via the signal ss3, thus connecting capacitors C2 and C3 together. The control circuit 2 is monitoring the voltages $V_{in}$, $V_a$, $V_b$ and $V_{out}$ and issues the related signal "shut switch s3" ss3 on the condition of "shut down" signal is on and voltage $V_{out}$=<voltage $V_b$. The signal "shut switch s3" ss3 activates the closing of switch s3 and opens the transistor switch P2 at the same time.

Both capacitors C2 and C3 then continue to be discharged via current limiting resistor R2 and transistor switch P2, respectively via current limiting resistor R1 and transistor switch P1, until their voltage is approximately equal to the voltage on C3 at which point the control block 2 closes switch s2, thus connecting all three capacitors together. The control circuit 2, monitoring the voltages $V_{in}$, $V_a$, $V_b$ and $V_{out}$ issues the related signal "shut switch s2" ss2 on the condition of "shut down" signal is on and voltage $V_b$=<voltage $V_a$. The signal "shut switch s2" ss2 activates the closing of switch s2 and opens the transistor switch P3 at the same time. All three capacitors C1, C2, and C3 then continue to discharge via transistor switches P1, P2 and P3 until their voltage is equal to or just less than the input voltage $V_{in}$, at which point switch s3 is closed and transistor switches P1, P2, and P3 are switched off if the circuit is to discharge to the input voltage $V_{in}$. The control circuit 2 issues the related signal "shut switch s1" ss1 on the condition of "shut down" signal is on and voltage $V_a$=<voltage $V_{in}$. The signal "shut switch s1" ss1 activates the closing of switch s1.

Transistors P1, P2 and P3 are internal transistors but they could be alternatively located external as well.

Alternatively switch s3 can be left open and transistor switches P1, P2 and P3 be left on to fully discharge all the capacitors.

Figure 2A:
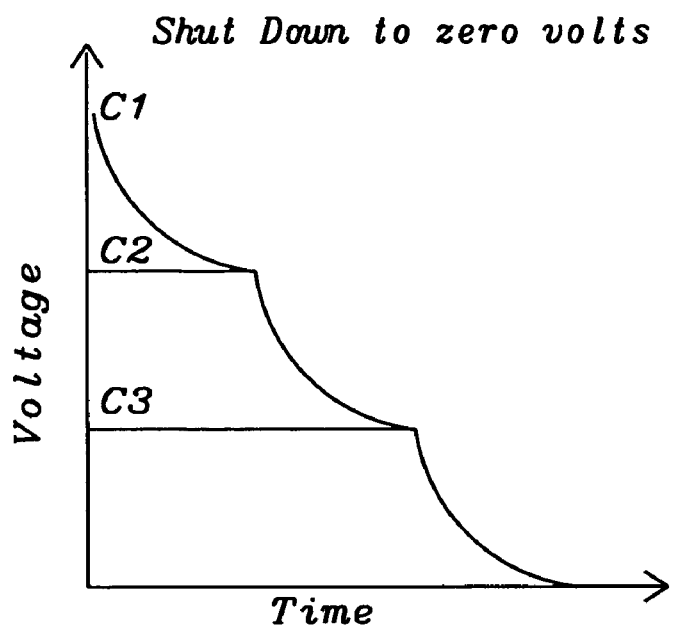
FIG. 2a illustrates the waveforms of the different stages of a charge pump during a shutdown to zero voltage.

FIG. 2a shows a time-chart of the discharge waveforms of the voltage on capacitors C1 to C3 in case of a discharge to zero volts. In the first time period the storage capacitor C1 is discharged until the voltage level of C2 is reached. In the second time period capacitors C1 and C2 are discharged until the voltage level of C1, which is equal to the input voltage $V_{in}$, is reached. In the third and last time period all three capacitors C1, C2 and C3 are discharged until a zero voltage level is reached.

Figure 2B:
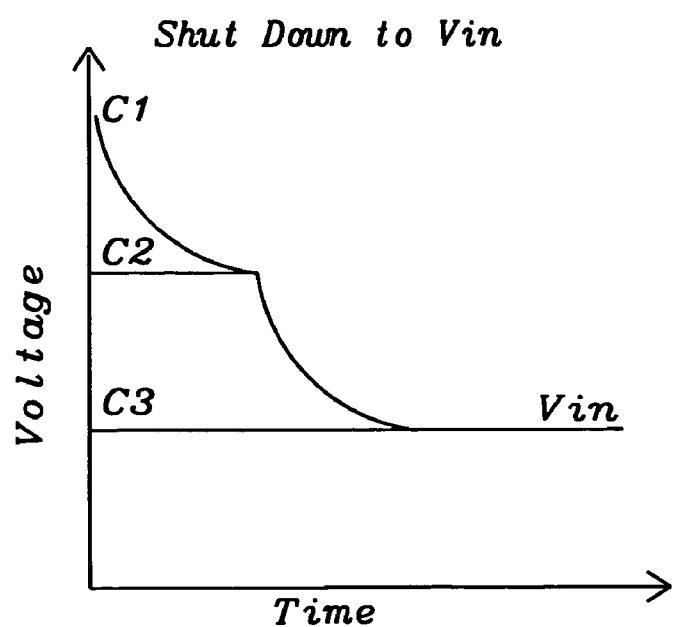
FIG. 2b illustrates the waveforms of the different stages of a charge pump during a shutdown to input voltage level.

FIG. 2b shows a time-chart of the discharge waveforms of the voltage on capacitors C1 to C3 in case of a discharge to the input voltage $V_{in}$. In the first time period the storage capacitor C1 is discharged until the voltage level of C2 is reached. In the second and last time period capacitors C1 and C2 are discharged until the voltage level of C1, which is already equal to the input voltage $V_{in}$, is reached.

Figure 3:
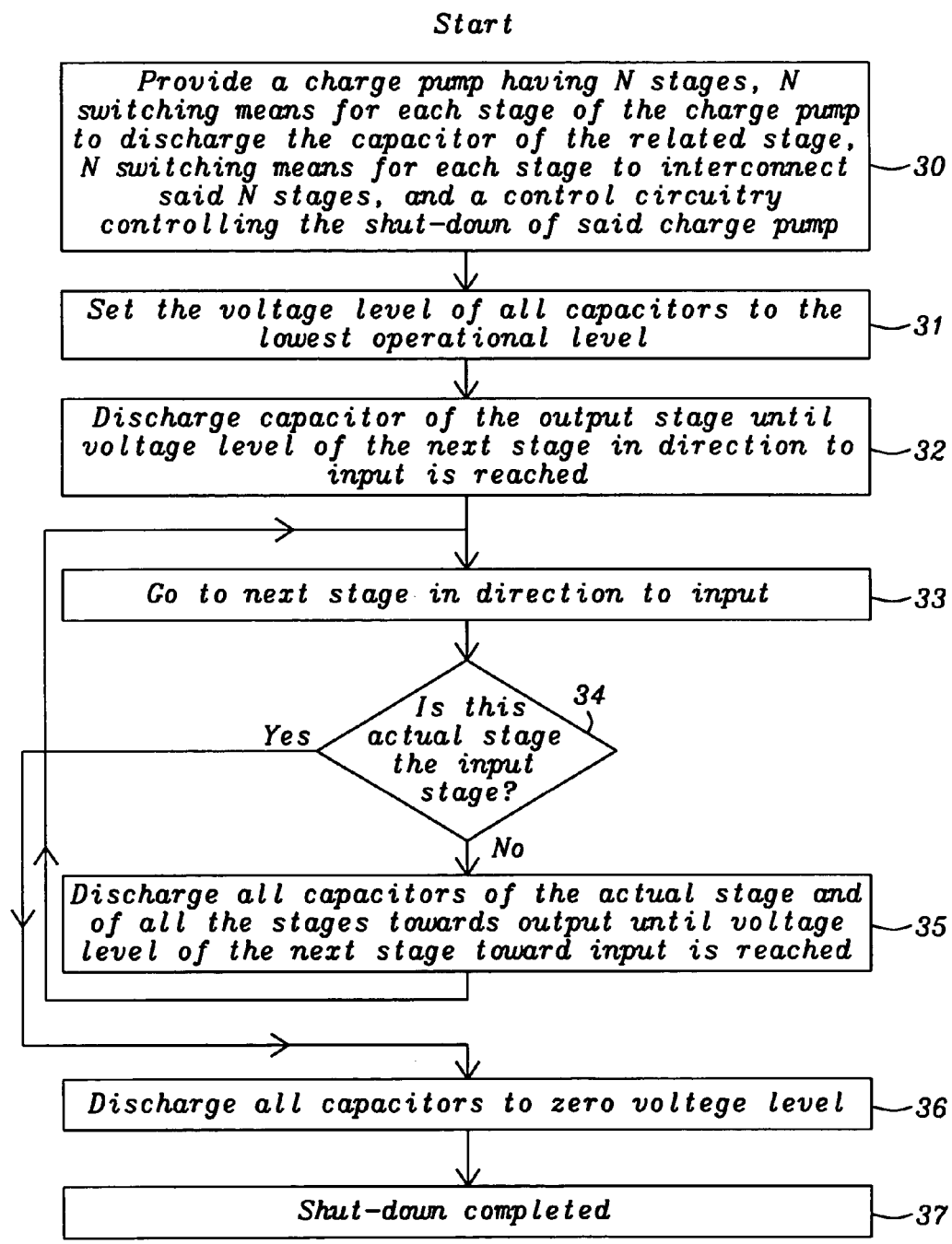
FIG. 3 shows a flowchart of a method invented for shutdown of a charge pump to zero voltage.

FIG. 3 shows a related method to shutdown a charge pump in stages from the output backwards to the input to zero voltage correspondent to the waveform shown in FIG. 2a.

Figure 4:
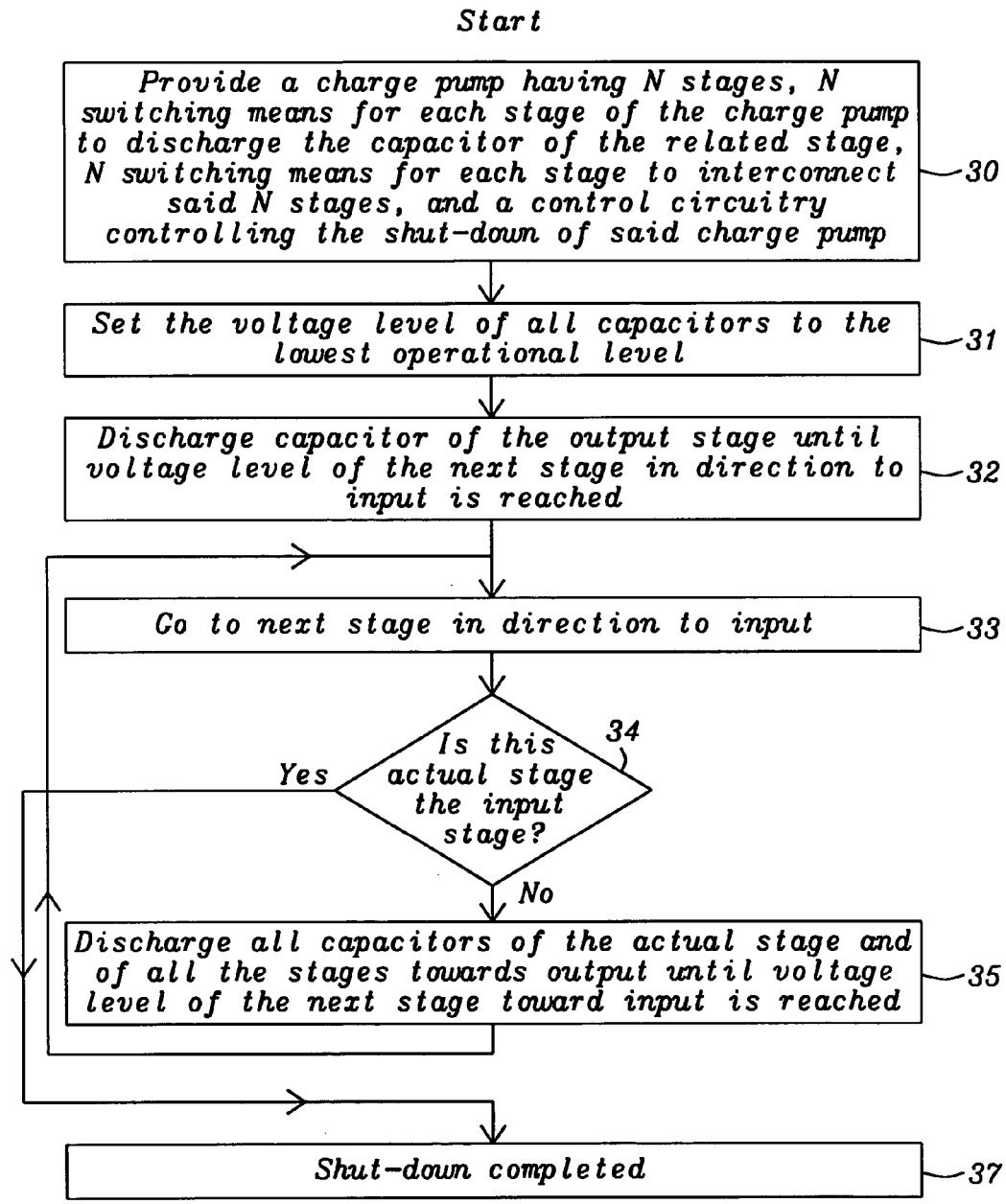
FIG. 4 shows a flowchart of a method invented for shutdown of a charge pump to input voltage level.

Step 30 describes the provision of a charge pump having N stages, N switching means for each stage of the charge pump to discharge the capacitor of the related stage, N switching means for each stage to interconnect said N stages, and of a control circuitry controlling the shut-down of said charge pump. In the next step 31 the voltage level of all capacitors of the charge pump is set to the lowest operational level. Step 32 describes the discharge of the capacitor of the output stage until the voltage level of the next stage in direction to input is reached. In the following step 33 the next stage in input direction is set the actual stage and then, in step 34, is a check if this stage is the input stage. In case the actual stage is not the input stage the process flow goes first to the next step 35, wherein all capacitors of the actual stage and of all the stages toward output are discharged until the voltage level of the next stage toward input is reached and then the process flow goes back to step 33 wherein the next stage towards input is set the actual stage. In case of the actual stage is the input stage in step 34, the process flow goes to step 36, wherein all capacitors are discharged to the voltage level of zero and then the shut-down is completed in step 37. Alternatively a counter could be used to count down the number of stages from the Nth stage, the output stage, to the first stage, the input stage FIG. 4 shows a related method to shutdown a charge pump in stages from the output backwards to the input to the input voltage level $V_{in}$ correspondent to the waveform shown in FIG. 2b. The first six steps of the method shown in FIG. 3 are identical to the first six steps shown in FIG. 4. Step 30 describes the provision of a charge pump having N stages and of a control circuitry controlling the shut-down of said charge pump. In the next step 31 the voltage level of all capacitors of the charge pump is set to the lowest operational level. Step 32 describes the discharge of the capacitor of the output stage until the voltage level of the next stage in direction to input is reached. In the following step 33 the next stage in input direction is set the actual stage and then, in step 34, is a check if this stage is the input stage. In case the actual stage is not the input stage the process flow goes first to the next step 35, wherein all capacitors of the actual stage and of all the stages toward output are discharged until the voltage level of the next stage toward input is reached and then the process flow goes back to step 33 wherein the next stage towards input is set the actual stage. In case of the actual stage is the input stage in step 34, the process flow goes to step 37, wherein the shutdown is completed. Alternatively a counter could be used to count down the number of stages from the Nth stage, the output stage, to the first stage, the input stage One advantage of the methods shown in FIGS. 3 and 4 is that during the shutdown process there is a reduced charge sharing between the capacitors so that no voltage exceeds its normal operating range, Furthermore the circuit and the methods of the present invention ensure that during shutdown of the charge pump no current is passed back to the supply, which could cause an over-voltage if the supply is derived from an LDO. Additionally the charge pump can be switched back on before the shutdown sequence is complete with all internal and external nodes of the charge pump staying within their normal operating range.

While the invention has been particularly shown and described with reference to the preferred embodiments thereof, it will be understood by those skilled in the art that various changes in form and details may be made without departing from the spirit and scope of the invention.

What is claimed is:

1. A circuit to shut down any charge pump having any number n (n: an integral number) of stages avoiding excessive voltages comprising:
   a control circuitry to control the shut-down of the charge pump having input and output, wherein the input comprises a shut-down signal, and the voltage levels of each of the n stages of the charge pump and the output comprises signals to shut switching means of each stage individually from the output backwards to the input according to the results of comparisons of the voltage levels of the nth stage with the voltage level of the (n−1)th stage and furthermore said signals to shut switching means to initiate the discharge of a capacitor of a related stage;
   n switching means for each stage of the charge pump to discharge the capacitor of the related stage, wherein one terminal of each of said switching means is connected via an own serial current limiting impedance to ground and the other terminal is connected to the voltage of the related stage and wherein the discharge of the related capacitor is controlled by said control circuitry;
   said n serial current limiting impedances, wherein each of them is connected between one of said n switching means for each stage to discharge the capacitor of the related stage;
   a control circuitry to control the normal operation of the charge pump until a shut-down signal is received and the control is taken over by said control circuitry to shut-down the charge pump;
   a supply voltage;
   n switching means for each stage to interconnect said n stages wherein said switching means can be activated as well by said control circuitry to control the normal operation as by the control circuitry to control the shut-down.

2. The circuit of claim 1 wherein said switching means for each stage to interconnect all stages are transistor switches.

3. The circuit of claim 1 wherein said switching means for each stage to discharge the capacitor of the related stage are transistor switches.

4. The circuit of claim 3 wherein said transistor switches are n-channel MOSFET enhancement mode transistors.

5. The circuit of claim 1 wherein said control circuitry to control the shutdown is performing said comparisons of the voltage level of the nth stage with the voltage level of the (n−1)th stage.

6. The circuit of claim 5 wherein a related signal is sent if the shutdown signal is set and the voltage of the nth stage is equal to or smaller than the voltage of the (n−1)th stage.

7. The circuit of claim 1 wherein said current limiting impedances are resistors.

8. The circuit of claim 1 wherein said supply voltage is provided by an LDO.

9. A circuit to shut down any charge pump having three stages avoiding excessive voltages comprising:
   a control circuitry to control the shut-down of the charge pump having input and output, wherein the input comprises a shut-down signal, and the voltage levels of each of the three stages of the charge pump and the output comprises signals to shut switching means of each stage individually from the output backwards to the input according to the results of comparisons of the voltage levels of a stage with the voltage level of the neighboring stage in input direction furthermore said signals to shut switching means to initiate the discharge of a capacitor of a related stage;
   three switching means for each stage of the charge pump to discharge the capacitor of the related stage, wherein one terminal of each of said switching means is connected via an own serial current limiting impedance to ground and the other terminal is connected to the voltage of the related stage and wherein the discharge of the related capacitor is controlled by said control circuitry;
   said three serial current limiting impedances, wherein each of them is connected between one of said three switching means for each stage to discharge the capacitor of the related stage;
   a control circuitry to control the normal operation of the charge pump until a shut-down signal is received and the control is taken over by said control circuitry to shut-down the charge pump;
   a supply voltage; and
   three switching means for each stage to interconnect said three stages wherein said switching means can be activated as well by said control circuitry to control the normal operation as by the control circuitry to control the shut-down.

10. The circuit of claim 9 wherein said switching means for each stage to interconnect all stages are transistor switches.

11. The circuit of claim 9 wherein said switching means for each stage to discharge the capacitor of the related stage are transistor switches.

12. The circuit of claim 11 wherein said transistor switches are n-channel MOSFET enhancement mode transistors.

13. The circuit of claim 9 wherein said control circuitry to control the shutdown is performing said comparisons of the voltage level of a stage with the voltage level of the neighboring stage in input direction.

14. The circuit of claim 13 wherein a related signal is sent if the shutdown signal is set and the voltage of a stage is equal to or smaller than the voltage of the neighboring stage in direction to the input.

15. The circuit of claim 9 wherein said current limiting impedances are resistors.

16. The circuit of claim 9 wherein said supply voltage is provided by an LDO.

17. A method to shut-down a charge pump in stages from the output backwards to the input stage to zero voltage avoiding excessive voltages comprising the following steps:
(1) providing a charge pump having N (N: an integral number) stages, N switching means for each stage of the charge pump to discharge a capacitor of the related stage, N switching means for each stage to interconnect said N stages, and a control circuitry controlling the shut-down of said charge pump;
(2) set the voltage level of all capacitors to the lowest operational level;
(3) discharge capacitor of the output stage until voltage level of the next stage in direction towards input is reached;
(4) go to next stage in direction to input;
(5) check if this actual stage counter is the input stage, then go to step 7 else go to step 6;
(6) discharge all capacitors of the actual stage and of the stages toward output until voltage level of the next stage towards input is reached and go to step 4;
(7) discharge all capacitors to zero voltage level; and
(8) shut-down completed.

18. The method of claim 17 wherein said number of stages is three.

19. The method of claim 17 wherein a counter is used to count down the number of stages during the shut-down process.

20. A method to shut-down a charge pump in stages from the output backwards to the input stage to input voltage level avoiding excessive voltages comprising the following steps:
(1) providing a charge pump having N (N: an integral number) stages, N switching means for each stage of the charge pump to discharge a capacitor of the related stage, N switching means for each stage to interconnect said N stages, and a control circuitry controlling the shut-down of said charge pump;
(2) set the voltage level of all capacitors to the lowest operational level;
(3) discharge capacitor of the output stage until voltage level of the next stage in direction towards input is reached;
(4) go to next stage in direction to input;
(5) check if this actual stage counter is the input stage, then go to step 7 else go to step 6;
(6) discharge all capacitors of the actual stage and of the stages toward output until voltage level of the next stage toward input is reached and go to step 4;
(7) shut-down is completed.

21. The method of claim 20 wherein said number of stages is three.

22. The method of claim 20 wherein a counter is used to count down the number of stages during the shut-down process.

* * * * *